United States Patent [19]
Yagi et al.

[11] 4,297,019
[45] Oct. 27, 1981

[54] AUTOMATIC FILM FEEDING APPARATUS FOR PHOTOGRAPHIC CAMERA

[75] Inventors: Michio Yagi; Kunio Nakajima; Yasutsugu Nakagawa; Sizuo Ishii; Kazuhisa Aratame, all of Hachioji, Japan

[73] Assignee: Konishiroku Photo Industry Co., Ltd., Tokyo, Japan

[21] Appl. No.: 66,337

[22] Filed: Aug. 14, 1979

[30] Foreign Application Priority Data

Aug. 22, 1978 [JP] Japan ................................ 53-102104

[51] Int. Cl.³ ........................ G03B 17/36; G03B 19/04
[52] U.S. Cl. ........................................ 354/171; 354/173; 354/213; 354/217
[58] Field of Search ................ 354/171, 173, 217, 218, 354/206, 213, 83

[56] References Cited

U.S. PATENT DOCUMENTS

| | | | |
|---|---|---|---|
| 3,750,551 | 8/1973 | Land et al. | 354/83 |
| 3,878,546 | 4/1975 | Adamski | 354/173 |
| 3,917,395 | 11/1975 | Ogawa | 354/173 X |
| 3,987,466 | 10/1976 | Murray, Jr. | 354/173 X |

*Primary Examiner*—L. T. Hix
*Assistant Examiner*—William B. Perkey
*Attorney, Agent, or Firm*—Bierman & Bierman

[57] ABSTRACT

An automatic film feeding apparatus for a camera includes a first switch operable in response to the opened or closed position of the camera rear cover, a second switch operable in response to the position of a film counter, a third switch operable in accordance with the position of a film strip in a camera, and an electronic control circuit for operating a film winding motor drive mechanism in response to predetermined states of the first, second, and third switches.

2 Claims, 1 Drawing Figure

AUTOMATIC FILM FEEDING APPARATUS FOR PHOTOGRAPHIC CAMERA

BACKGROUND OF THE INVENTION

The present invention relates in general to a photographic camera and in particular to an automatic film feeding apparatus for feeding a photographic film strip automatically to a frame at which photographing is to be initiated in response to the closing of a rear cover of the camera after the film has been loaded therein.

As an apparatus for winding a photographic film up to a frame at which the photographing is to be initiated after the film has been placed in a photographic camera, there has been hitherto known an idle feeding mechanism for photographic cameras of a manual winding-up type in which the automatic stopping of the film feeding is effected with the aid of mechanical frame detection and a mechanical stopper. Consequently, the prior art apparatus suffers from disadvantages in that a complicated mechanism is required to realize desired coupling and disconnection, involving expense and instability in operation.

Accordingly, a primary object of the present invention is to provide an automatic film feeding apparatus which is capable of automatically feeding a loaded film to a frame at which the photographing is to be initiated with a much simplified and reliable arrangement by making use of an existing motor drive mechanism of a motor drive type photographic camera.

Now, the invention will be described in detail by referring to the accompanying drawings which illustrate a preferred embodiment of the invention by way of example only.

DETAILED DESCRIPTION OF THE PREFERRED EMBODIMENT

Figure 1:
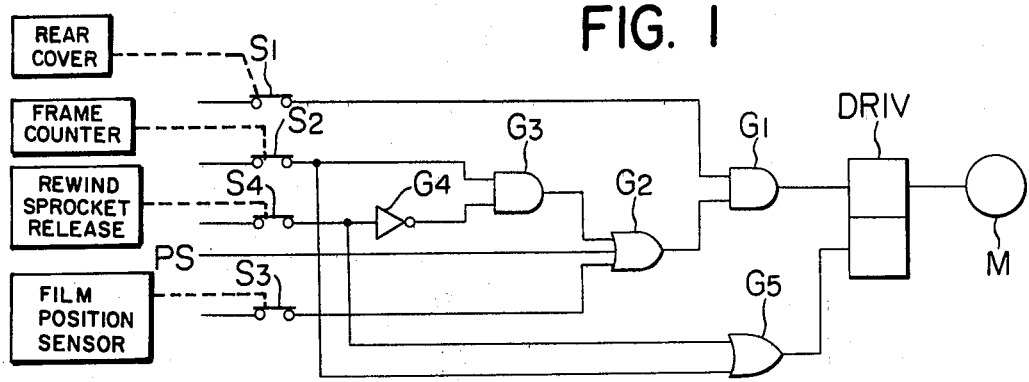
FIG. 1 is a schematic circuit diagram illustrating a general arrangement of an automatic film feeding apparatus for a photographic camera according to an embodiment of the invention.

Referring to FIG. 1, a switch $S_1$ is adapted to be changed over in response to the opening and closing movements of a rear cover of a photographic camera (not shown) in such a manner that an AND gate $G_1$ is enabled or opened when the rear cover is closed. There is provided a second switch $S_2$ which is interlocked with a film counter (not shown in Figure) in a manner such that a logic "1" signal is supplied to an input of an AND gate $G_3$ until the film counter has counted up to the frame of the photographic film at which the photographing is to be initiated (herein referred to as the photographing initiating frame) from a start position. A third switch $S_3$ is interlocked with a film winding-up mechanism (not shown in the Figure) so that a logic "1" signal is supplied to an OR gate $G_2$ for a next film winding up operation after the photographing has been completed. A fourth switch $S_4$ is interlocked with a sprocket releasing button (not shown) so that a logic "1" signal is supplied to an inverter $G_4$ in response to the disengagement of film feeding sprockets (not shown). The inverter $G_4$ will then produce a logic "0" output which is supplied to the AND gate $G_3$ to close or block the gate.

The logic "1" output signal from the AND gate $G_1$ is utilized for energizing a motor M through a motor drive circuit DRIV.

The automatic film feeding apparatus illustrated in FIG. 1 is thus constituted by the motor M, the motor drive circuit DRIV and the switch $S_3$ which are usually provided inherently in a motor drive type photographic camera in combination with the additionally provided switches $S_1$, $S_2$ and $S_4$ and the logic circuits $G_1$, $G_2$, $G_3$ and $G_4$ in the manner described above. Next, description will be made of operations of the automatic film feeding apparatus.

In the opened state of the rear cover, the film counter of a self-resetting type is reset to the start position, as the result of which the switch $S_2$ produces the logic "1" output. It should be mentioned that the sprocket releasing button is also automatically reset when the rear cover is opened.

In other words, when the film is to be rewound after a completed photographing, the sprocket releasing button is set or actuated to effect the rewinding. When the rear cover is opened to extract outwardly the rewound film after the rewinding operation, the sprocket releasing button is automatically restored to the original state. Consequently, the switch $S_4$ produces the logic "0" output in response to the opening of the rear cover, resulting in the logic "1" output from the inverter $G_4$ to allow the logic "1" output to be produced from the AND gate $G_3$. At that time, the output from the OR gate $G_2$ is logic "1" independently from the states of the switch $S_3$.

Saying alternatively, so long as the rear cover is opened, the logic "1" signal produced from the switch $S_2$ will cause the logic "1" output to be produced from the gate $G_2$ through the gates $G_3$ and $G_2$. However, since the gate $G_1$ is blocked by the signal from the switch $S_1$, the motor M remains in the de-energized state.

When the rear cover is closed after a film has been loaded, the switch $S_1$ is changed over to enable or open the AND gate $G_1$, as the result of which the drive operation of the motor M and hence the film winding-up operation is triggered by the logic "1" signal output from the switch $S_2$.

When the film has been wound up to a predetermined length, for example, two or three frames, the output signal of the switch $S_2$ is changed over to the logic "0" level. However, if the output from the switch $S_3$ is at logic "1" level at that time, the film winding-up operation will continue until the output from the switch $S_3$ has become logic "0" at the normal photographing initiating frame position, whereupon the motor driving is stopped.

In the course of the successive photographings, a photographing end signal PS is applied to the OR gate $G_2$ simultaneously with the completion of a single frame photographing to trigger the film winding-up operation for a film length corresponding to a single frame. The duration of the photographing end signal PS is selected to be sufficient for the output signal from the switch $S_3$ to be changed over to drive the motor. In this manner, the stoppage of the film winding-up operation is realized through the restoration or resetting of the switch $S_3$.

Assuming now that the film winding-up operation is further to be continued after the photographing has been made at the last film frame, it may happen that the film winding operation is rendered impossible because a film length corresponding to a frame length is not available. Under such situation, energization of the motor is stopped by detecting an over-current state or by resorting to the use of a current supply circuit having a predetermined operating duration such as those employed in conventional motor drive type photographic cameras. For example, it is assumed that a timer circuit adapted to allow a current supply for a predetermined time duration in response to the logic "1" signal output from the gate $G_5$ is provided in the motor drive circuit and that the timer is reset by the logic "1" signal from the switch $S_2$ or $S_4$. Although the film has to be rewound, the winding mechanism is not in the normal rewinding state but at a temporal stop position at which the switch $S_3$ is in the state corresponding to the film winding-up operation. Under these conditions, the sprocket releasing button is set to release the timer circuit thereby to allow the current to be supplied again to the motor. Then, the film feeding sprocket is disconnected, whereby the film winding mechanism is solely operated in a normal cycle corresponding to a single frame with the film remaining at the temporal stop position. Then, the switch $S_3$ is reset to stop the motor.

Next, upon rewinding the film, the film counter is counted down as the film is rewound, resulting in that the switch $S_2$ is changed over to the logic "1" output to produce the motor drive signal. However, since the output signal from the switch $S_4$ is logic "1" at that time and hence the output from the inverter $G_3$ is logic "0", the motor is inhibited from being driven.

As will be appreciated from the foregoing description, the invention has now provided an improved automatic film feeding apparatus which can be inexpensively implemented by a small number of circuit elements added to and combined with an existing motor drive mechanism of a motor drive type photographic camera and which is capable of automatically feeding the film to a photographing initiating frame position in response to the closing of the rear cover.

What is claimed is:

1. An automatic film feeding apparatus for a photographic camera which utilizes a film strip and which includes a motor drive mechanism for winding the film strip to photographic exposure enabling frame positions therealong, a counter operable for indicating the frame positions of the film strip, and a rear cover of the camera movable between an open position for film loading and removal and a closed position for photographic exposure of the film, said film feeding apparatus comprising:

a first switch operable in response to the position of the rear cover of the camera and switchable between a first state when the rear cover is closed and a second state when the rear cover is open;

a second switch operable in response to the position of the film counter and switchable between a first state until the counter indicates movement of the film strip to a first photographic exposure frame position and a second state when the counter indicates movement of the film strip to at least said first exposure frame position;

a third switch operable in accordance with the position of the film strip and switchable between a first state when the film strip is at a photographic exposure frame position and a second state when the film strip is remote from an exposure frame position; and electronic control circuit means for operating the motor drive mechanism in response to the states of said first, second and third switches, said circuit means being adapted to operate the motor drive mechanism when said first and second switches are switched to said first states thereof and independently of the state of said third switch so as to automatically wind and feed the film strip substantially to said first photographic exposure frame on loading of the film strip into the camera and movement of the rear cover to its closed position, and said control circuit being further adapted to operate the motor drive mechanism when said first switch is in its first state and said third switch is in its second state and independently of the state of said second switch so as to wind the film strip to the next exposure frame position after photographic exposure at the preceding frame position.

2. An automatic film feeding apparatus according to claim 1 wherein the photographic camera includes a sprocket releasing member operable to enable rewinding of the film strip, said apparatus further comprising a fourth switch actuatable by the sprocket releasing member and switchable from a normal first state to a second state when the releasing member is operated, said control circuit means being further responsive to said fourth switch such that switching of the fourth switch to said second state thereof for enabling rewinding of the film strip disables the operation of the motor drive mechanism normally resulting from the switching of said first and second switches to their first states, whereby winding of the film strip to a next exposure frame by the motor drive mechanism is prevented during rewinding of the film strip.

* * * * *